(12) United States Patent
Sawatzki et al.

(10) Patent No.: US 10,766,539 B2
(45) Date of Patent: Sep. 8, 2020

(54) MOTOR VEHICLE WITH AUXILIARY FRAME

(71) Applicant: Ford Global Technologies, LLC, Dearborn, MI (US)

(72) Inventors: Marius Sawatzki, Pulheim (DE); Dominik Mueller, Euskirchen (DE); Stefan Schneider, Rösrath (DE); Daniel Meckenstock, Wuppertal (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/190,257

(22) Filed: Nov. 14, 2018

(65) Prior Publication Data

US 2019/0176891 A1 Jun. 13, 2019

(30) Foreign Application Priority Data

Dec. 8, 2017 (DE) .................. 10 2017 222 225

(51) Int. Cl.
*B62D 24/00* (2006.01)
*B62D 21/11* (2006.01)
*B62D 21/15* (2006.01)
*B62D 27/02* (2006.01)
*B62D 27/06* (2006.01)
*B62D 25/08* (2006.01)

(52) U.S. Cl.
CPC .............. *B62D 24/00* (2013.01); *B62D 21/11* (2013.01); *B62D 21/155* (2013.01); *B62D 27/023* (2013.01); *B62D 27/06* (2013.01); *B62D 27/065* (2013.01); *B62D 25/082* (2013.01); *B62D 27/026* (2013.01)

(58) Field of Classification Search
CPC .... B62D 24/00; B62D 21/155; B62D 27/023; B62D 27/06
USPC ................................................ 296/35.1, 35.2
See application file for complete search history.

(56) References Cited

U.S. PATENT DOCUMENTS 2,446,609 A * 8/1948 Reed ...................... B64C 25/001
244/121
3,695,629 A * 10/1972 Schlanger ............... B60R 19/02
280/730.1

(Continued)

FOREIGN PATENT DOCUMENTS

DE 10134288 * 1/2003 .......... B62D 21/155
DE 102014013909 A1 3/2015

(Continued)

OTHER PUBLICATIONS

DE Examination Report dated Nov. 6, 2018 re DE Application 102017222225.5.

*Primary Examiner* — Dennis H Pedder
(74) *Attorney, Agent, or Firm* — David Coppiellie; Bejin Beineman PLC

(57) ABSTRACT

A motor vehicle (10) having a passenger compartment (12) and a front compartment (13) arranged in the direction of a longitudinal axis (X) in front of the passenger compartment (12) is provided. Here, the passenger compartment (12) is surrounded by a body (14) comprising a slope (16). In the front compartment (13), an auxiliary frame (17) is arranged. As claimed in the disclosure, a spacing (22) is formed between the auxiliary frame (17) and the slope (16) in the direction of the longitudinal axis (X) and a spacer piece (19) is arranged in this spacing.

16 Claims, 2 Drawing Sheets

(56) References Cited

U.S. PATENT DOCUMENTS

| | | | | |
|---|---|---|---|---|
| 3,743,347 A | * | 7/1973 | Shaw | B62D 39/00 |
| | | | | 296/35.2 |
| 3,806,184 A | * | 4/1974 | Dean | B60G 99/002 |
| | | | | 296/35.1 |
| 3,837,422 A | * | 9/1974 | Schlanger | B62D 39/00 |
| | | | | 280/734 |
| 3,917,339 A | * | 11/1975 | Fritz | B60N 2/4214 |
| | | | | 296/68.1 |
| 5,090,774 A | * | 2/1992 | Dolla | B60R 19/00 |
| | | | | 296/187.08 |
| 5,251,911 A | * | 10/1993 | Blake | B62D 39/00 |
| | | | | 180/274 |
| 6,808,229 B2 | | 10/2004 | Yamaguchi | |
| 7,721,837 B1 | * | 5/2010 | DeVeau | B62D 39/00 |
| | | | | 180/274 |
| 8,267,429 B2 | * | 9/2012 | Takeshita | B62D 21/155 |
| | | | | 280/784 |
| 8,333,425 B2 | * | 12/2012 | Yoshida | B62D 21/155 |
| | | | | 296/187.09 |
| 9,650,074 B2 | * | 5/2017 | Shirooka | B62D 21/11 |
| 2015/0061272 A1 | * | 3/2015 | Watanabe | B62D 21/11 |
| | | | | 280/784 |
| 2016/0107694 A1 | * | 4/2016 | Kaneko | B62D 21/155 |
| | | | | 280/784 |

FOREIGN PATENT DOCUMENTS

| | | |
|---|---|---|
| EP | 2999617 B1 | 9/2017 |
| JP | 2004130827 A | 4/2004 |

* cited by examiner

MOTOR VEHICLE WITH AUXILIARY FRAME

CROSS-REFERENCE TO RELATED APPLICATION

This patent application claims priority to and all benefits of German Application No. DE 102017222225.5 filed on Dec. 8, 2017, which is hereby incorporated by reference in its entirety.

FIELD OF THE DISCLOSURE

The present disclosure relates to a motor vehicle with a passenger compartment, a front compartment and an auxiliary frame arranged in the front compartment.

BACKGROUND

In the prior art, a vehicle front structure is known from U.S. Pat. No. 8,333,425 B2, which comprises a front end part with a step section, which extends obliquely downward in the direction of the rear, a front part, which is arranged nearer the front of the vehicle than the step section, and a rear part, which is arranged nearer the rear of the motor vehicle than the step section, and an auxiliary frame, which is arranged below the front part and lies against the rear part or the step section. A tail end section of the auxiliary frame with a first inclination section is formed, which extends obliquely downward in the direction of the rear and lies against the front part, wherein the front part is formed with a second inclination section, which lies against the first inclination section. The first inclination section is held so that it is movable relative to the second inclination section.

SUMMARY

The present disclosure is based on the object of providing a motor vehicle with improved arrangement of the auxiliary frame.

The motor vehicle according to the disclosure comprises a passenger compartment and a front compartment arranged in the direction of a longitudinal axis in front of the passenger compartment. The passenger compartment is surrounded by a body having a slope. In the front compartment, an auxiliary frame is arranged. According to the disclosure, a spacing between the auxiliary frame and the slope is formed in the direction of the longitudinal axis and a spacer piece is arranged in this spacing.

With the arrangement of the spacer piece it is achieved that the free space between the auxiliary frame and the slope has a small value that is more favorable for crash characteristics. The crash characteristics, in particular for a head-on crash are thus improved. In addition, the present disclosure makes possible using auxiliary frames which have a relatively large spacing from the body. Because of this, the auxiliary frames are useable for a larger number of body versions or, on the other hand, additional auxiliary frame versions can be saved. Accordingly, a more cost-effective manufacture of various motor vehicle models is achieved.

In an advantageous configuration of the motor vehicle according to the disclosure, the spacer piece fills out the spacing between the auxiliary frame and the slope in the direction of the longitudinal axis by at least four fifths.

Thus, the spacing is optimally filled out and the remaining free space is as small as possible without restricting the assembly capability.

In a further advantageous configuration of the motor vehicle according to the disclosure, the spacer piece is attached to the slope or to the auxiliary frame. Here, the spacer piece is in particular glued, screwed, clipped or welded to the slope or to the auxiliary frame.

With the attachment to the slope, the stiffness of the same is increased. With the attachment to the auxiliary frame, the same is lengthened.

In a further advantageous configuration of the motor vehicle according to the disclosure, the spacer piece is produced from the same material as the slope.

Thus, at least similar material properties are provided. The joining of the spacer piece to the slope can be simplified because of this.

In a further advantageous configuration of the motor vehicle according to the disclosure, the spacer piece includes solid material or of filled material.

Thus, as high as possible a stiffness of the spacer piece is achieved. The high stiffness of the spacer piece avoids the auxiliary frame digging into the spacer piece during a head-on collision and thus makes possible a sliding-off.

In a further advantageous configuration of the motor vehicle according to the disclosure, the auxiliary frame is connected to the slope by means of a connecting part.

With the connecting part, an additional retaining point for the auxiliary frame is created. By way of differently embodied connecting parts it is made possible to connect differently embodied auxiliary frames to the body. By way of this, the number of combination possibilities of auxiliary frame and body is increased.

The connecting part is designed as predetermined failure part in particular in the manner that a movement of the auxiliary frame along a vertical axis directed downward is not obstructed. Here, the connecting part is designed in particular for the dislodging of the auxiliary frame in the direction of the longitudinal axis, wherein the auxiliary frame can slip off the connecting part free of any moment.

Thus, the connecting part supports the slipping-off movement of the auxiliary frame in the event of a head-on collision.

In a further advantageous configuration of the motor vehicle according to the disclosure, the spacer piece comprises a touch surface, which is positioned opposite a contact surface, which is arranged on the auxiliary frame or on the slope, wherein the touch surface and/or the contact surface comprise(s) a sliding layer.

By way of this, a sliding-off of the auxiliary frame is additionally promoted.

Further advantages of the present disclosure are evident from the detailed description and the figures. The disclosure is explained in more detail by way of the figures and the following description. In the figures:

DETAILED DESCRIPTION

Figure 1:
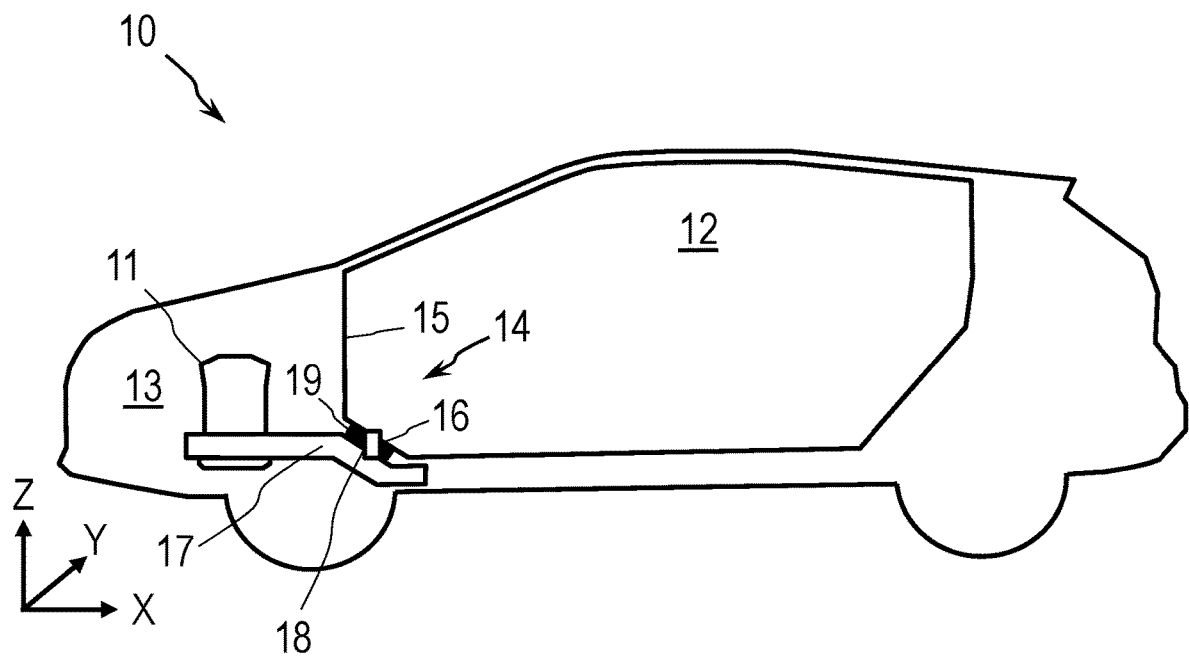
FIG. 1 shows a motor vehicle according to the disclosure in an exemplary configuration.

In FIG. 1, the motor vehicle 10 according to the disclosure is schematically shown in an X-Z plane in an exemplary configuration. The X-Z plane is formed of a longitudinal axis X and a vertical axis Z. A transverse axis Y runs normally relative to the X-Z plane.

The motor vehicle 10 comprises a passenger compartment 12 and a front compartment 13. The passenger compartment 12 is an interior space formed by a body 14 for accommodating at least one passenger. The front compartment 13 is arranged on the front end of the passenger compartment 12, i.e. in the longitudinal axis X in front of the passenger compartment 12. The front compartment 13 is in particular an engine compartment, in which a motor 11 is arranged.

Between the front compartment 13 and the passenger compartment 12, a separating wall 15 is preferably arranged. The separating wall 15 separates the front compartment 13 from the passenger compartment 12. The separating wall 15 is also known as bulkhead. The separating wall 15 is part of the body 14.

Below the separating wall 15, i.e. in the vertical axis Z below the separating wall 15, a slope 16 is formed. The slope 16 is in particular a surface of a side member which is not shown, which substantially extends alongside the longitudinal axis X. The motor vehicle 10 in particular comprises two of these side members, one on the left and one on the right motor vehicle side. The slope 16 is part of the body 14.

Furthermore, the motor vehicle 10 comprises an auxiliary frame 17 which is arranged, at least in part, in the front compartment 13. The auxiliary frame 17 is designed in particular for receiving the motor 11, a drive part or a chassis part. The auxiliary frame 17 according to the disclosure is arranged spaced apart from the slope 16 so that there is a spacing 22 between the slope 16 and the auxiliary frame. The spacing 22 is formed in the X-Z plane and comprises at least one component in the longitudinal axis X.

According to the disclosure, a spacer piece 19 is arranged in the spacing 22, which spacer piece can also be referred to as body spacer. The spacer piece 19 is formed in the manner so as to force the auxiliary frame 17, upon a movement in the direction of the longitudinal axis X, downward in the negative direction of the vertical axis Z. The spacer piece 19 has a defined thickness in the longitudinal axis X. Because of this, the free space in the X-Z plane between the auxiliary frame 17 and the slope 16 is at least reduced. The thickness is designed in particular so that the spacer piece 19 fills out the spacing 22 in the direction of the longitudinal axis X by at least a half, in particular by at least four fifths. The spacer piece 19 has such a high stiffness that upon a movement of the auxiliary frame 17 in the direction of the longitudinal axis X, digging-in of the auxiliary frame 17 into the spacer piece 19 is avoided and thus a sliding-off of the auxiliary frame 17 from the spacer piece 19 is made possible.

Figure 2:
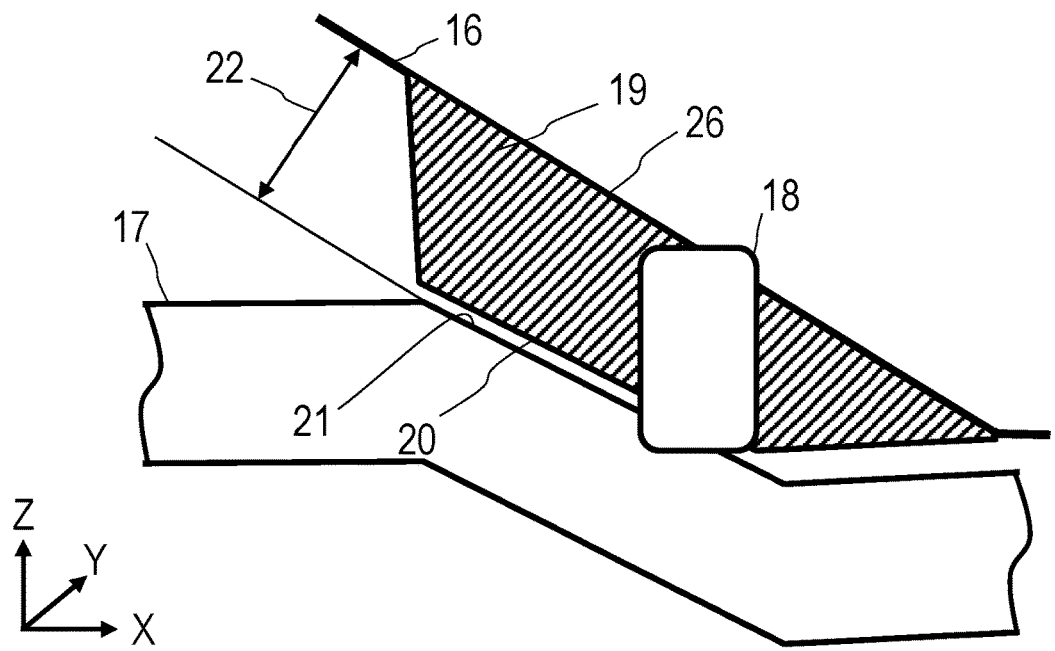
FIG. 2 shows a detail view of the motor vehicle according to the disclosure in a first exemplary configuration in a first situation.
Figure 3:
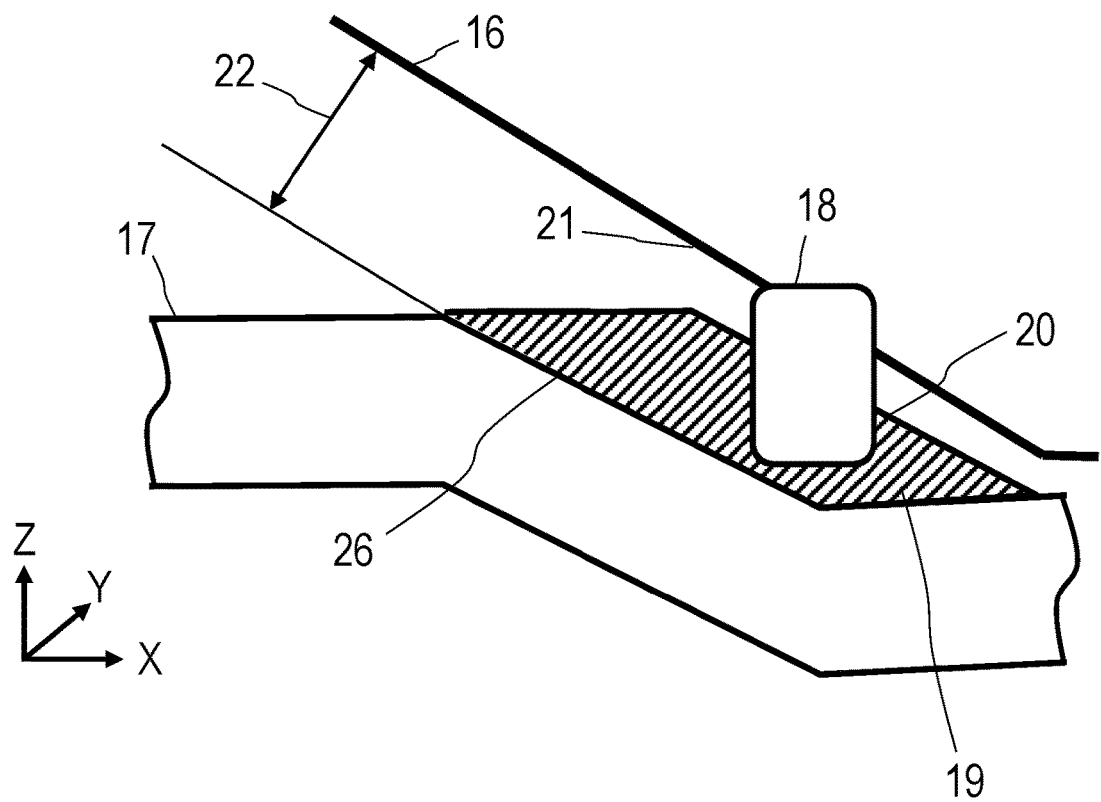
FIG. 3 shows a detail view of the motor vehicle according to the disclosure in a second exemplary configuration in the first situation.
Figure 4:
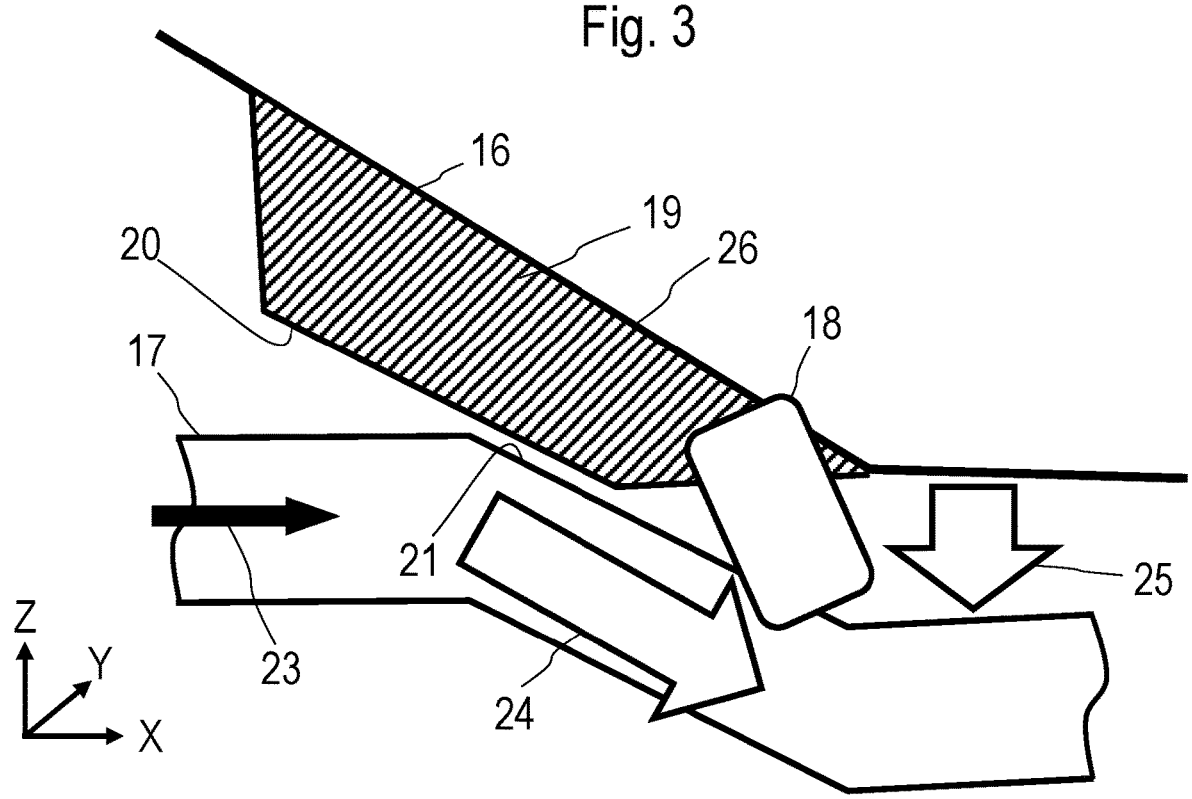
FIG. 4 shows the detail view of the first configuration in a second situation.

The spacer piece 19 has an assembly side 26, with which the spacer piece 19 is attached to the remaining motor vehicle 10. Here, the spacer piece is attached in particular to the slope 16. This is the way in which it is shown in FIGS. 2 and 4. Alternatively to the attachment to the slope 16, the spacer piece 19 can be attached to the auxiliary frame 17. This is the way in which it is shown in FIG. 3. The spacer piece 19 is attached on the assembly side 26 by means of welding, gluing, screwing or clipping.

Opposite the assembly side 26, the spacer piece 19 has a touch surface 20. This touch surface 20 faces a contact surface 21. If the spacer piece 19 is attached to the slope 16, as is shown in FIG. 2, the contact surface 21 is formed on the auxiliary frame 17. If the spacer piece 19 is attached to the auxiliary frame 17, as is shown in FIG. 3, the contact surface 21 is formed on the slope 16. Both the touch surface 20 and also the contact surface 21 are designed for sliding off of one another. Accordingly, both surfaces 20, 21 have an adequate width extending in the direction of the transverse axis Y, so that in the event of a crash touching of both surfaces 20, 21 can take place over a predefined width. The structural stiffness of both surfaces 20, 21 is formed in the manner that the surfaces 20, 21 contacting one another do not dig into one another in the event of a crash. The touch surface 20 and/or the contact surface 21 is/are provided, in particular, with a sliding layer. The sliding layer in this case is formed by a predefined surface quality in terms of the roughness and/or by a coating which includes a material with a relatively low adhesion and sliding friction coefficient for example polytetrafluoroethylene (PTFE). By way of the low friction on the contact point, the vertical movement 25 is reduced to a minimum.

The spacer piece 19 is formed in particular from the same material as the slope 16 or the auxiliary frame 17, i.e. for example a steel, in particular a high-strength steel. In the case of a stiff material such as for example steel, the spacer piece 19 has an appropriate wall thickness and is produced for example from a deep-drawn sheet metal part. Alternatively, the spacer piece 19 includes solid material or of a filled material. The filling material in this case can be for example metal foam within a relatively thin-walled sheet steel. Here, a lightweight material is selected, for example plastic, composite material or an aluminum alloy. A foam filling, for example aluminum foam, is also conceivable.

Beside other connecting points, the auxiliary frame 17 can be connected to the body 14 at least also on the slope 16. For this purpose, a connecting part 18 is provided in particular, which connects the auxiliary frame 17 to the slope 16 or to the spacer piece 19 attached to the slope 16. The connecting part 18 is designed in particular as predetermined failure part in the manner that it fails or becomes dislodged when the auxiliary frame 17 is displaced in the direction of the longitudinal axis X. The auxiliary frame 17 can slip off the connecting part 18 free of moments. By way of this, a movement of the auxiliary frame 17 directed downward along the vertical axis Z is made possible. The spacer piece 19 is configured in the manner that it does not obstruct the dislodging of the connecting part 18.

In FIG. 4, the mode of operation of the spacer piece 19 in the event of a crash, thus under the effect of a force 23 in the direction of the longitudinal axis X, is schematically shown. The mode of operation applies both to the attachment of the spacer piece 19 to the slope 16 and also to the attachment of the spacer piece 19 to the auxiliary frame 17. The force 23 occurs for example upon a head-on crash of the motor vehicle 10. If the force 23 acts on the auxiliary frame 17 in the direction of the longitudinal axis X, the movement of the auxiliary frame 17 is then restricted by the spacer piece 19 in the direction of the longitudinal axis X. The spacer piece 19 forms the touch surface 20 at an acute angle relative to the longitudinal axis X. The touch surface 20 faces the contact surface 21. If the auxiliary frame 17 moves in the direction of the longitudinal axis X, the contact surface 21 thus strikes the touch surface 20 of the spacer piece 19. Because of the stiff configuration of the spacer piece 19, the auxiliary frame 17 is forced into a sloping movement 24. The sloping movement 24 is approximately parallel to the touch surface 20, in the example shown also parallel to the slope 16. Thus, the sloping movement 24 comprises a vertical component, which is shown as vertical movement 25 here. With the spacer piece 19 it is achieved that the auxiliary frame 17, upon a force 23 acting horizontally, thus alongside the longitudinal axis X, is forced into a vertical movement 25. Thus it is prevented that the auxiliary frame 17 enters the passenger compartment 12. A failure of the connecting part 18 is facilitated by the increased component of tensile force, caused by the growing component of vertical movement 25.

Although the disclosure was explained and described in more detail by the preferred exemplary embodiments, the disclosure is not restricted in this manner by the disclosed examples and other variations can be derived from this by the person skilled in the art without leaving the scope of protection of the disclosure.

The figures are not necessarily true to detail and to scale and can be shown enlarged or reduced in size, in order to provide a better overview. For this reason, functional details disclosed here must not be understood as being restrictive but merely as an illustrative base offering instructions to the person skilled in the art in this field of technology in order to employ the present disclosure in manifold ways.

The term "and/or" used here, when utilized in a number of two or more elements means that each of the elements mentioned can be used alone or each combination of two or more of the elements mentioned can be used. If for example a composition is described containing the components A, B and/or C, the composition can comprise A alone; B alone; C alone; A and B combined; A and C combined; B and C combined; or A, B and C combined.

The invention claimed is:

1. A motor vehicle comprising:
   a passenger compartment;
   a front compartment arranged in the direction of a longitudinal axis in front of the passenger compartment;
   a body surrounding the passenger compartment and including a slope;
   an auxiliary frame in the front compartment;
   wherein a spacing in the direction of the longitudinal axis is formed between the auxiliary frame and the slope and a spacer piece is arranged in the spacing; and
   a connecting part extending from the auxiliary frame to the slope at the spacing and connecting the auxiliary frame to the slope;
   wherein the connecting part is elongated along a vertical axis.

2. The motor vehicle as set forth in claim 1, wherein the spacer piece fills the spacing between the auxiliary frame and the slope in the direction of the longitudinal axis by at least four fifths.

3. The motor vehicle as set forth in claim 1, wherein the spacer piece is attached to the slope.

4. The motor vehicle as set forth in claim 3, wherein the spacer piece is glued, screwed, clipped, or welded to the slope.

5. The motor vehicle as set forth in claim 1, wherein the spacer piece is attached to the auxiliary frame.

6. The motor vehicle as set forth in claim 5, wherein the spacer piece is glued, screwed, clipped, or welded to the auxiliary frame.

7. The motor vehicle as set forth in claim 1, wherein the spacer piece is of the same type of material as the slope.

8. The motor vehicle as set forth in claim 1, wherein the spacer piece is solid material.

9. The motor vehicle as set forth in claim 1, wherein the spacer piece is filled material.

10. The motor vehicle as set forth in claim 1, wherein the connecting part is designed as a predetermined failure part in the manner that a movement of the auxiliary frame directed downward along a vertical axis is not obstructed.

11. The motor vehicle as set forth in claim 1, wherein the spacer piece includes a touch surface, which is positioned opposite a contact surface, the contact surface being on the auxiliary frame or on the slope, wherein the touch surface and/or the contact surface includes a sliding layer.

12. The motor vehicle as set forth in claim 1, wherein the slope of the body extends through the vertical axis at a non-right angle.

13. The motor vehicle as set forth in claim 12, wherein the auxiliary frame is parallel to the slope of the body at the spacing and at the connecting part.

14. The motor vehicle as set forth in claim 13, further comprising a motor supported on the auxiliary frame.

15. The motor vehicle as set forth in claim 1, further comprising a motor supported on the auxiliary frame.

16. The motor vehicle as set forth in claim 1, wherein the spacing is empty around the connecting part.

* * * * *